United States Patent
Doerr et al.

(10) Patent No.: US 7,283,709 B2
(45) Date of Patent: Oct. 16, 2007

(54) INTEGRATED MICROELECTROMECHANICAL WAVELENGTH SELECTIVE SWITCH AND METHOD OF MAKING SAME

(75) Inventors: Christopher Richard Doerr, Middletown, NJ (US); Dan Mark Marom, Howell, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 35 days.

(21) Appl. No.: 11/244,778

(22) Filed: Oct. 6, 2005

(65) Prior Publication Data
US 2007/0081761 A1  Apr. 12, 2007

(51) Int. Cl.
G02B 6/26 (2006.01)
G02B 6/42 (2006.01)
G02B 6/34 (2006.01)

(52) U.S. Cl. .............................. 385/47; 385/31; 385/37; 385/39; 385/46; 385/50

(58) Field of Classification Search ................... 385/47
See application file for complete search history.

(56) References Cited

U.S. PATENT DOCUMENTS

2004/0151429 A1* 8/2004 Janz et al. ..................... 385/27
2004/0234201 A1* 11/2004 Logvin et al. ................ 385/37

OTHER PUBLICATIONS

Chi et al, "Solid-Immersion Micromirror with Enhanced Angular Deflection for Silicon-Based Planar Lightwave Circuits", Proc. Of Optical MEMS, Aug. 2005.*

"Solid-Immersion Micromirror with Enhanced Angular Deflection for Silicon-Based Planar Lightwave Circuits" by C-H. Chi et al, pubished in Proc. of Optical MEMS, Aug. 2005.

D.T.Fuchs et al., "A hybrid MEMS-waveguide wavelength selective cross-connect," IEEE Photonics Technol.Lett., vol. 16, pp. 99-101, 2004.

C.H.Chi et al., "Integrated 1×4 WSS with on-chip MEMS mirrors," QELS Conference, Baltimore, MD., 2005, Paper JThE58, pp. 1732-1734, IEEE 2005.

* cited by examiner

Primary Examiner—Frank G. Font
Assistant Examiner—Ryan Lepisto

(57) ABSTRACT

A fully integrated microelectromechanical (MEMS) 1xK wavelength selective switch (WSS) includes an array of N solid-immersion micromirrors (SIMs) and a K+1 dispersion waveguide arrays that are integrally fabricated together. In one embodiment, the WSS is fabricated in Silicon. In another embodiment, the N actuators of the SIMs are etched in the Silicon layer of a Silicon-on Insulator (SOI) wafer. Thereafter, a Silica layer is deposited on the Silicon layer and the K+1 waveguide arrays and the mirrors for the N SIMs are etched in that Silica layer. In yet another embodiment, the K+1 dispersion waveguide arrays, except for a small portion of the common confocal coupler, are fabricated using a material selected from a group including Silica, sol-gel, polymers, that is deposited on a first wafer selected from a group including Silicon, Saphire, or other glass insulator material and the remaining portion of the common confocal coupler and the N SIMs are fabricated in a Silicon wafer, and the first wafer and Silicon wafer are then butt-coupled together.

8 Claims, 4 Drawing Sheets

INTEGRATED MICROELECTROMECHANICAL WAVELENGTH SELECTIVE SWITCH AND METHOD OF MAKING SAME

CROSS-REFERENCE TO RELATED APPLICATIONS

This application is related to U.S. patent application Ser. No. 11/244,768 filed Oct. 6, 2005, which is incorporated by reference herein.

FIELD OF THE INVENTION

The present invention relates to wavelength selective switches, and more particularly to a method and apparatus for implementing an integrated microelectromechanical (MEMS) wavelength selective switch (WSS).

BACKGROUND OF THE INVENTION

Wavelength-selective switches (WSSs) are of utmost importance for optical networking, for implementing reconfigurable optical add/drop multiplexers (ROADM) and path switching in mesh networking. WSS have been demonstrated in planar lightwave circuits (PLC) typically using thermooptic switching, in free-space optics using MEMS micromirror switching, and in some hybrid configurations mixing PLC and MEMS technology. PLC is advantageous due to its form factor (flat packaging) and robustness whereas MEMS micromirror switching is advantageous for its low power consumption, multistate switching states, and high extinction. Combining the two technologies directly is hindered by the fact that MEMS micromirrors actuate in free-space, in contrast to the PLC where light is guided in some higher index solid material. Recently a rotating, solid-immersion mirror design (FIG. 1) has been proposed and demonstrated within the guiding PLC (see "Solid-Immersion Micromirror with Enhanced Angular Deflection for Silcon-Based Planar Lightwave Circuits" by C-H. Chi et al, published in Proc. of Optical MEMS, August 2005). The solid-immersion micromirror 110 (the rotating portion that includes the mirror 111) is separated by a curved air gap 112 from the remaining guiding PLC 113. The air gap separation equals a quarter of a wavelength of the guided light (or additional increments of half-wavelength). Hence the reflections from the interfaces between the two guided regions 110, 113 and the air gap 112 destructively interfere. The mirror 111 is formed by etching into the rotating portion 110 and metalizing the surface, or by creating a Bragg mirror structure using the guided material 110 and air.

However, while this solid-immersion micromirror (SIM) arrangement provides improved deflection and reduced diffraction loss, it needs to be integrated with additional structures on the PLC in order to construct a WSS. Other attempts of integrating MEMS mirrors (non-immersion type) with PLCs to construct WSSs have been reported, using piston actuation (D. T. Fuchs, et al, "A hybrid MEMS-waveguide wavelength selective cross-connect," Photon Technol Lett 16, pp. 99-101, 2004) and tilting mirrors (C. H. Chi et al, "Integrated 1×4 WSS with on-chip MEMS mirrors," CLEO 05, Baltimore, Md., "CLEO 05). What is needed is a way to fully integrate the SIM unit together with the PLC to form a planar wavelength-selective switch (WSS).

SUMMARY OF THE INVENTION

In accordance with the present invention, we describe a fully integrated planar N-WDM channnel microelectromechanical (MEMS) 1×K wavelength selective switch (WSS) that includes an array of N solid-immersion micromirrors (SIMs) and K+1 dispersive waveguide arrays that are integrally fabricated together. In another embodiment, we use two wafers, one with waveguiding material such as Silica or polymer and the second for constructing the SIMs from mechanically strong material such as Silicon, the two wafers are then butt-coupled to each other.

More particularly we disclose an optical apparatus for switching a multi-wave input optical signal of N channels comprising:
  an integrated planar lightwave circuit (PLC) including
    K+1 input/output waveguides, where K is an integer greater than or equal to one;
    K+1 dispersive waveguide arrays, each waveguide array including a coupler coupled to a different one of the K+1 input/output waveguides, an arrayed waveguide grating (AWG) connected at a first end to the coupler and connected at a second end to a first surface of a common confocal coupler;
  an array of N solid-immersion micromirror (SIM) devices, where N is an integer greater than one, each SIM device placed at a different location on a second surface of the common confocal coupler and selectably rotatable to reflect the light of one channel received from a first dispersive waveguide array back through a second dispersive waveguide array.

In various other embodiments our integrated PLC may be fabricated
  (A) Using Silicon for both guiding and switching the light.
  (B) Using a waveguiding material such as Silica deposited over Silicon which is used for switching.
  (C) Using two wafers, one with waveguiding material such as Silica and the second for constructing the SIM devices from Silicon and butt-coupling the two wafers to each other.

According to another aspect of the invention, a method is disclosed for fabricating the WSS of embodiments described above in sections (B) and (C).

BRIEF DESCRIPTION OF THE FIGURES

Other aspects, features, and advantages of the present invention will become more fully apparent from the following detailed description, the appended claims, and the accompanying drawings in which:

DETAILED DESCRIPTION

Figure 1:
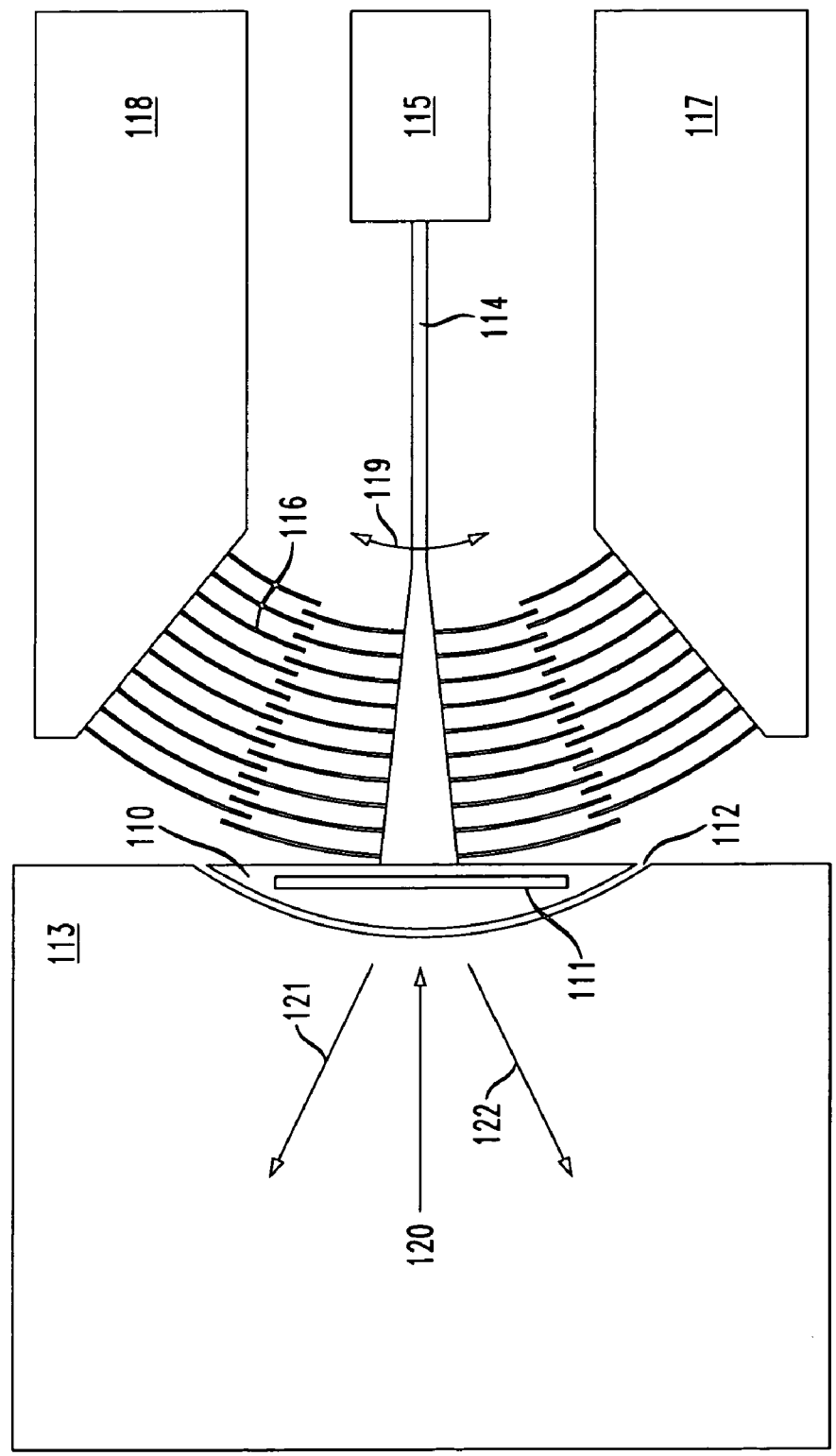
FIG. 1 is an illustration of prior art solid-immersion micromirrors (SIMs) arrangement.

Shown in FIG. 1 is an illustration of prior art solid-immersion micromirror (SIM) arrangement 100 fabricated in a Silicon-on-insulator (SOI) wafer. The SIM 110 includes a rotatable portion that includes the mirror 111 etched therein. The SIM 110 is separated by a curved air gap 112 from the remaining guiding PLC 113. The air gap equals a quarter of a wavelength of the guided light (or additional increments of half-wavelength). Hence the reflections from the interfaces between the two guided regions 110, 113 and air gap 112 destructively interfere. The SIM is supported by a flexure arm 114 that is connected to an electrically-grounded terminal 115. One part of a rotary comb-drive unit 116 is connected to the flexure arm 114 and enables SIM 110 to rotate in either in a clockwise or counterclockwise direction 119 when an appropriate voltage is applied to either control terminals 117 or 118, which are each connected to a second portion of comb-drive unit 116. In this manner SIM 110 can be made to control the reflection of a light beam 120 in a variety of directions, e,g., 121, 122.

Figure 2:
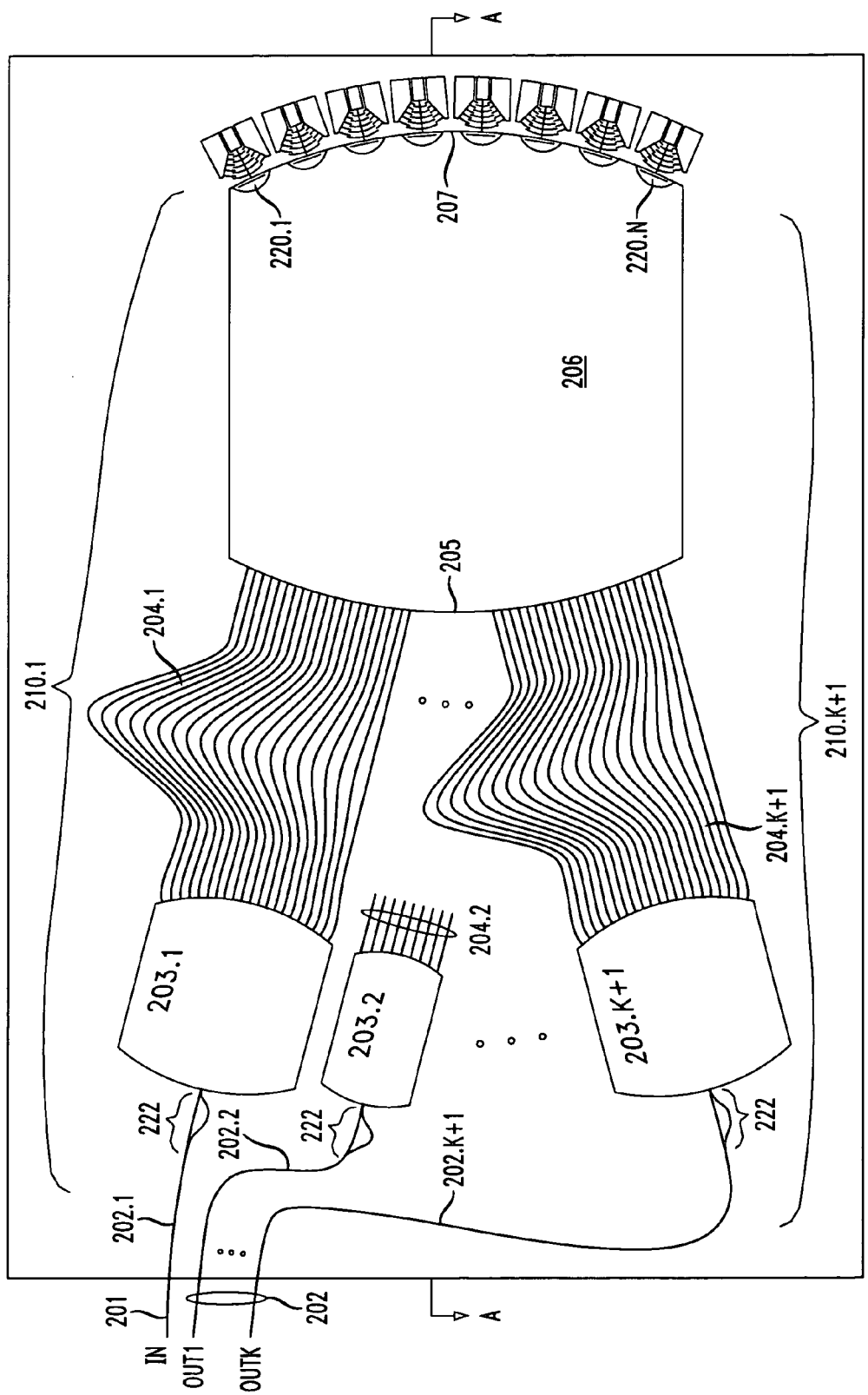
FIG. 2 illustratively shows one inventive embodiment of a fully integrated arrangement of a wavelength selective switch (WSS) that includes an array of SIMs.

With reference to FIG. 2 there is shown one inventive PLC embodiment of a fully integrated arrangement of a wavelength selective switch (WSS) 200 that includes a PLC together with an array of SIM devices. The WSS 200 has a 1×K functionality, where K is an integer greater than or equal to one, implying that there is a single input fiber 201 with a multi-wave input optical signal, IN, such as a dense wavelength division multiplexed (DWDM) signal having N wavelength channels, where N is an integer greater than one. The WSS 200 can distribute any of the N channels to any of the K output fibers 202, OUT1-OUTK. The WSS 200 switch can also be operated in reverse for a K×1 functionality, where the input and output are reversed. Each of the K+1 input/output fibers attached to one of the waveguides, 202.1-202.K+1, which guides light to an associated one of the K+1 couplers, 203.1-203.K+1. Each coupler, e.g, 203.1, couples the light from the waveguide into an arrayed waveguide grating (AWG), e.g., 204.1. All the AWGs, 204.1-204.K+1, terminate on the same confocal surface 205 of a common confocal coupler 206. The above described K+1 arrangements of a waveguide, a coupler, an associated AWG and common confocal coupler 206 describes K+1 dispersive waveguide arrays 210.1-210.K+1, each having a free-spectral range (FSR) or bandwidth equal to at least the bandwidth occupied by the N WDM channels. As is known in the art, the radiated light from each AWG 204.1-204.K+1 is linearly dispersed onto the second confocal surface 207. Since there are K+1 AWGs attached to the same free-space region 206, but at different locations along surface 205, the linearly dispersed light of each AWG will be superimposed on the second surface 207, but each at a different incidence angle. Hence, the second surface 207 is ideal for placement of rotating solid immersion MEMS micromirror (SIM) array 220.1-220.K. Each mirror is placed along the circular arc of the second surface 207 where the focus points of each of the N channels of the DWDM signal impinge. Each mirror is independently controlled to switch the bandwidth of a single DWDM channel (or could be designed to switch a band of channels), so that the reflected light will couple through the desired dispersive waveguide array to the desired output port/fiber. Illustratively, FIG. 2 is shown as a 1×K switch where the fiber 201 is the input port IN that receives an input DWDM signal and the fibers 202 serve as the K output ports, OUT1-OUTK. Thus any single DWDM channel received at input port IN can be switched by WSS 200, using the associated one of the SIM devices 220.1-220.K, to one of the K output ports, OUT1-OUTK.

In accordance with the present invention, an additional waveguide array, e.g., 222, can be added in front of each of the K+1 couplers, 203.1-203.K+1. The use of the additional waveguide array and its interaction with the dispersion waveguide arrays 210.1-210.K+1 is "described in detail in our U.S. patent application Ser. No. 11/244,768, which is " incorporated by reference herein. The additional waveguide array 222 has a free-spectral range (FSR) that is equal to the channel separation of the DWDM signal while the FSR of the K+1 dispersion waveguide arrays 210.1-210.K+1 has a bandwidth that is equal to at least the bandwidth occupied by the N WDM channels. The waveguide array 222 includes two or more waveguides having different lengths, the length difference determines the FSR that sets the bandwidth of each of the discrete light spots formed at the second confocal surface 207. Illustratively, the waveguide array 222 may be implemented as a Mach-Zehnder interferometer or as a well-known waveguide grating router. The input waveguide array 222 generates a spatial mode that is shifting its location as a function of frequency. The interaction of the moving input spatial mode (produced by input waveguide array 222) together with the linear dispersion by the K+1 dispersive waveguide arrays 210.1-210.K+1 results in light signal that is dispersed into the discrete spots on the second confocal surface 207. Thus, for example, the combination of the waveguide array, 222, together with a dispersion array, e.g., 210.1, produces a discrete spot for each of the N wavelength channels that impinge at the center of a different one of the rotating SIMs 220.1-220.K. The use of a "focused" discrete spot eliminates the problem of light falling on the edge of a micromirror (in any of its various rotated positions) or light falling in the intergap regions between the SIM devices.

In accordance with the present invention, WSS 200 including the dispersive waveguide arrays 210.1-210.K+1 and the array of SIMs 220.1-220.K can be integrally fabricated from the same material, such as Silicon, using well known processing and micromachining techniques. Using a Silicon-on-Insulator, SOI, platform or wafer (Silicon base, thin oxide layer, and Silicon layer), a full etch to the oxide layer is used to define the SIM devices, whereas a timed etch is used to define a ridge waveguide for guiding light.

Figure 4A:
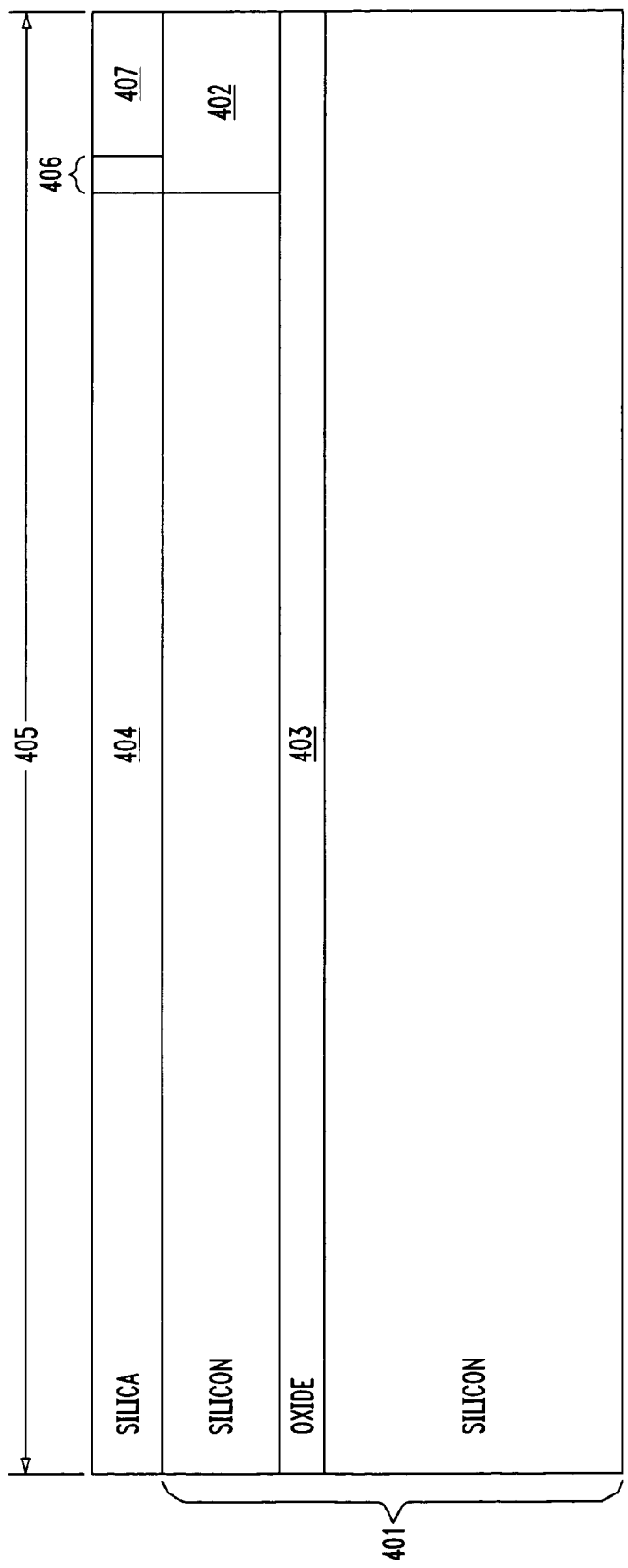
FIGS. 4A and 4B, show a cross section side view of the WSS of FIGS. 2 and 3, respectively.

With reference to FIG. 4A, another fabrication embodiment of WSS 200 of FIG. 2 is shown. FIG. 4A shows an cross-section side view of a section A-A of WSS 200 of FIG. 2. This embodiment starts with a Silicon-on-Insulator, SOI, wafer 401. The SIM actuator (rotary comb-drive unit 116 and flexure arm 114) is etched in region 402. The actuator is released by etching the exposed oxide layer 403 under the actuator. Silica is deposited in region 404 (over the whole wafer 405) and the K+1 waveguide arrays 210.1-210.K+1 formed (clad, core, clad) in region 404. The rotatable mirror portion of each of the SIM devices 220.1-220.K is then etched in the Silica in region 406 (region 407 removed).

Figure 3:
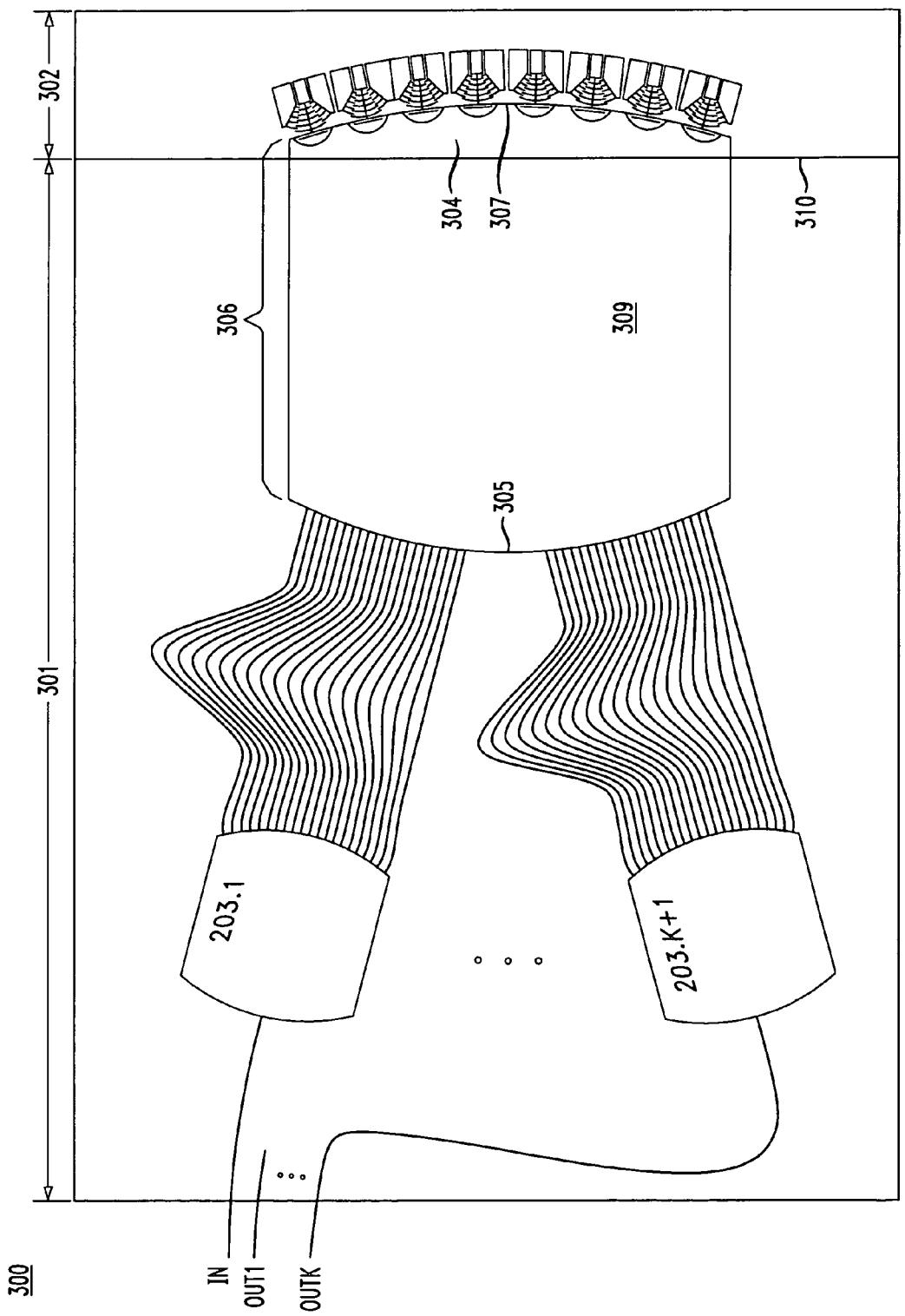
FIG. 3 illustratively shows another inventive embodiment of a fully integrated integrated arrangement of a wavelength selective switch (WSS) that includes an array of SIMs.
Figure 4B:
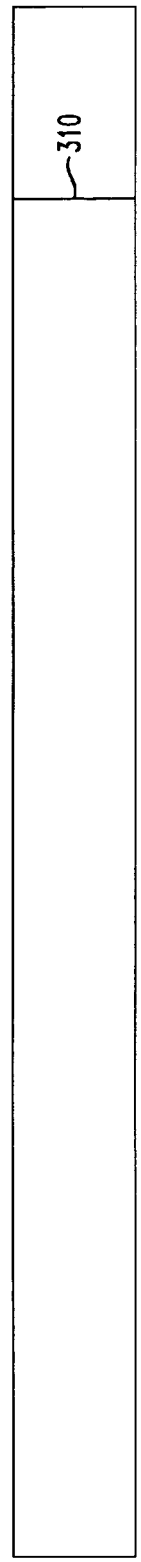

With reference to FIG. 3, and in particular to an arrangement 300, we describe a preferred technique to implement WSS 200. Since the preferred guiding material is typically Silica 301 and the preferred micromachining material is Silicon 302, it is possible to butt-couple the two different wafers 301 and 302. In this arrangement, the dispersive waveguide arrays 210.1-210.K+1 that include the elements that do most of the light handling tasks, including waveguides, couplers, AWG implementations, and the majority portion 309 of the confocal coupler 306 (that includes the portion from the first curved surface 305 to edge 310) are implemented in a Silica wafer 301 using well known techniques. At edge 310 of the majority portion 309 of the confocal coupler the Silica is cut and polished. The remaining (or minority) portion 304 of confocal coupler (that includes the remaining portion of the common confocal coupler 306) together with the array of SIMs 220.1-220.K are fabricated in a Silicon wafer 302 using the well known micromachining techniques described in the previously referenced Solid-Immersion Micromirror article. The left side of portion 304 of Silicon wafer 302 is cut and polished and butt-coupled along edge 310 to the polished right side of portion 309 of Silica wafer 301. An index matching adhesive may be advantageously used. A cross section of the butt-couple is shown in FIG. 4B. Due to the higher refractive index of the Silicon versus Silica, the radius of curvature of the second surface 307 of confocal free-space region 306 is greater than the radius of curvature of the second surface 207 of confocal free-space region 206 of FIG. 2. The ratio of this radius increase is equal to the ratio of the refractive indices of silcon to Silica (roughly 3.5/1.5=2.333). This is further advantageous as the tilt angle ranges of the micromirrors is also reduced by the same factor, facilitating the design of the SIM devices.

It should also be noted that one of the dispersion waveguides arrays can have a different grating order, thus serving as a multiplexer/demultiplexer.

It should be understood that this invention is not limited to the particular embodiments disclosed, but it is intended to cover modifications within the spirit and scope of the present invention as defined by the appended claims.

We claim:

1. An optical apparatus for switching a multi-wave input optical signal of N channels comprising:
    a planar integrated lightwave circuit (PLC) including
        K+1 input/output waveguides, where K is an integer greater than or equal to one;
        K+1 dispersive waveguide arrays, each waveguide array including a coupler coupled to a different one of the K+1 input/output waveguides, an arrayed waveguide grating (AWG) connected at a first end to the coupler and connected at a second end to a first surface of a common confocal coupler; and
    an array of N solid-immersion micromirror (SIM) devices, where N is an integer greater than one, each SIM device placed at a different location on a second opposing surface of the common confocal coupler and each SIM device having a respective actuator for providing independently controllable rotation,
    such that the light of one channel received by any one SIM device, from a first dispersive waveguide array is selectively reflected back through a second dispersive waveguide array connected to the first surface of the common confocal coupler.

2. The optical switching apparatus of claim 1 wherein the PLC is fabricated using a Silicon-on-insulator wafer.

3. The optical switching apparatus of claim 1
    wherein the PLC is fabricated using a Silicon wafer with a thin oxide layer and a Silicon layer deposited thereon, N actuators of the SIM devices being formed by etching the Silicon layer, and
    wherein a Silica layer is deposited on the Silicon layer and both the K+1 waveguide arrays are formed and N mirrors for the SIM devices are etched in the Silica layer.

4. The optical switching apparatus of claim 1 wherein
    the K+1 dispersive waveguide arrays, except for a small portion of the common confocal coupler, are fabricated using a material selected from a group including Silica, sol-gel, polymers, that is deposited on a first wafer selected from a group including Silicon, Saphire, or other glass insulator material, and
    the remaining portion of the common confocal coupler and the N SIM devices are fabricated in a Silicon wafer, and wherein the first wafer and Silicon wafer are then butt-coupled together to form the PLC.

5. The optical switching apparatus of claim 1 wherein
    the K+1 dispersive waveguide arrays, except for a small portion of the common confocal coupler, are fabricated using a material selected from a group including Silica, sol-gel, polymers, that is deposited on a first wafer selected from a group including Silicon, Saphire, or other glass insulator material, and
    the remaining portion of the common confocal coupler and the N SIM devices are fabricated in a Silicon wafer, and wherein the first wafer and Silicon wafer are then butt-coupled together to form the PLC.

6. An optical switching apparatus for switching a multi-wave input optical signal of N channels comprising:
    a planar integrated lightwave circuit (PLC) including
        K+1 input/output waveguides, where K is an integer greater than or equal to one;
        K+1 first waveguide arrays, each first waveguide array having at least two waveguides and having a free-spectral range equal to the channel separation of the input optical signal, the first waveguide array introducing a first dispersion into the input optical signal;
        K+1 dispersive waveguide arrays, each waveguide including a coupler coupled to a different one of the K+1 first waveguide arrays, an arrayed waveguide grating (AWG) connected at a first end to the coupler and connected at a second end to a first surface of a common confocal coupler,
    wherein each of the K+1 dispersive waveguide arrays has a free-spectral range at least equal to the bandwidth of all of the channels of the input optical signal, and
    wherein each first waveguide array couples an optical signal between a different one of the K+1 input/output waveguides and a respective one of the K+1 dispersive waveguide arrays,
    such that each of the K+1 dispersive waveguide arrays produces a second dispersion which adds to the first dispersion introduced to the input optical signal by a corresponding one of the K+1 first waveguide arrays to generate discrete spots on a second opposing surface of the common confocal coupler, one spot for each of the N channels; and
    an array of N solid-immersion micromirror (SIM) devices, where N is an integer greater than one, each SIM device placed at a different location on the second surface of the common confocal coupler and each SIM device further including a respective actuator for providing independently controllable rotation,
    such that the light of one channel received by any one SIM device from a first dispersive waveguide array is selectively reflected back through a second dispersive waveguide array connected to the first surface of the common confocal coupler.

7. The optical switching apparatus of claim 6 wherein the PLC is fabricated using a Silicon-on-insulator wafer.

8. The optical switching apparatus of claim 6
    wherein the PLC is fabricated using a Silicon wafer with a thin oxide layer and a Silicon layer deposited thereon, N actuators of the SIM devices being formed by etching the Silicon layer, and
    wherein a Silica layer is deposited on the Silicon layer and both the K+1 waveguide arrays are formed and N mirrors for the SIM devices are etched in the Silica layer.

* * * * *